Oct. 27, 1970 W. F. POTTS 3,536,427

OIL BURNER CONTROL SYSTEM

Filed Jan. 6, 1969

INVENTOR.
WILLIAM F. POTTS.

BY

ATTORNEY

United States Patent Office 3,536,427
Patented Oct. 27, 1970

3,536,427
OIL BURNER CONTROL SYSTEM
William F. Potts, Liverpool, N.Y., assignor to Liberty Combustion Corporation, Syracuse, N.Y., a corporation of New York
Filed Jan. 6, 1969, Ser. No. 789,259
Int. Cl. F23n 5/24
U.S. Cl. 431—68                2 Claims

ABSTRACT OF THE DISCLOSURE

A combined burner control and ignition voltage generator circuit for use on oil burners which turns on burner motor only when ignition generator is operating properly, or alternately shortens to normal lockout time on certain component short circuit failures to achieve new advantages in safe oil burner control.

---

In the majority of oil burner control circuits, the control circuitry is arranged so that when the burner controller, usually a thermostatically operated switch, indicates the need for heat from the burner, the motor driving the fuel pump and combustion air blower is turned on simultaneously with the spark ignition voltage source. In this generally accepted arrangement, the ignition voltage source is presumed to be in operating condition but, if it is not, and consequently the burner fails to be ignited, a flame sensor associated with the burner and operative on the burner control circuit will sense the absence of flame, thus allowing a safety timer and control disabling device to shut the burner off until the disabling device is manually reset. With this method of controlling the burner, if the ignition voltage source is inoperative, fuel will be pumped into the burner without being ignited until the safety timer causes the burner to be shut off, and if the shut-off device is repeatedly reset in attempts to ignite the burner, considerable fuel will accumulate in the burner to present a hazardous situation.

The present invention provides an arrangement using, for example, a capacitor-discharge spark ignition voltage generator, of the type described in my co-pending patent applications 583,032 (now Pat. No. 3,447,880, issued June 3, 1969), 739,606 and 750,657 in conjunction with a circuit breaker of the heater-bimetallic type having a latching arrangement to provide the safety timing and burner shutoff device, and a second heater-responsive switch to provide a short delay of about one second, both the heaters being in the charging circuit of the discharge capacitor in the ignition voltage generator whereby an electro-mechanical relay which controls the supply of power to the burner motor will not operate until the second heater-responsive switch has been heated by several repetitive chargings of the discharge capacitor, thus indicating that the ignition voltage generator is operating. In addition, the invention provides an arrangement whereby if the discharge capacitor or any of the semiconductor devices which charge or discharge the discharge capacitor in the ignition voltage generator fail in the short circuited mode, the heater in the circuit breaker will, as a result, have significantly increased current thereby greatly reducing the operating time for the safety shutoff device from the normal 15 to 30 seconds to a few seconds.

Accordingly an object of the present invention is to provide a combined burner control and spark ignition generator circuit which allows the burner control to turn the burner on only when the spark ignition generator is initially proved to be operating and free from any short circuit failure modes in the discharge capacitor or any of the semiconductor devices in the spark ignition generator.

Another object of the invention is to provide a greatly shortened safety timing period to cause rapid shutoff of the burner in the event of short circuit failure modes in any of the semiconductor devices or the discharge capacitor in the ignition voltage generator.

A further object of the invention is to arrange the combined circuitry so that the burner control section may be physically separated from the spark ignition generator with a minimum of interconnections.

The above and other objects and novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
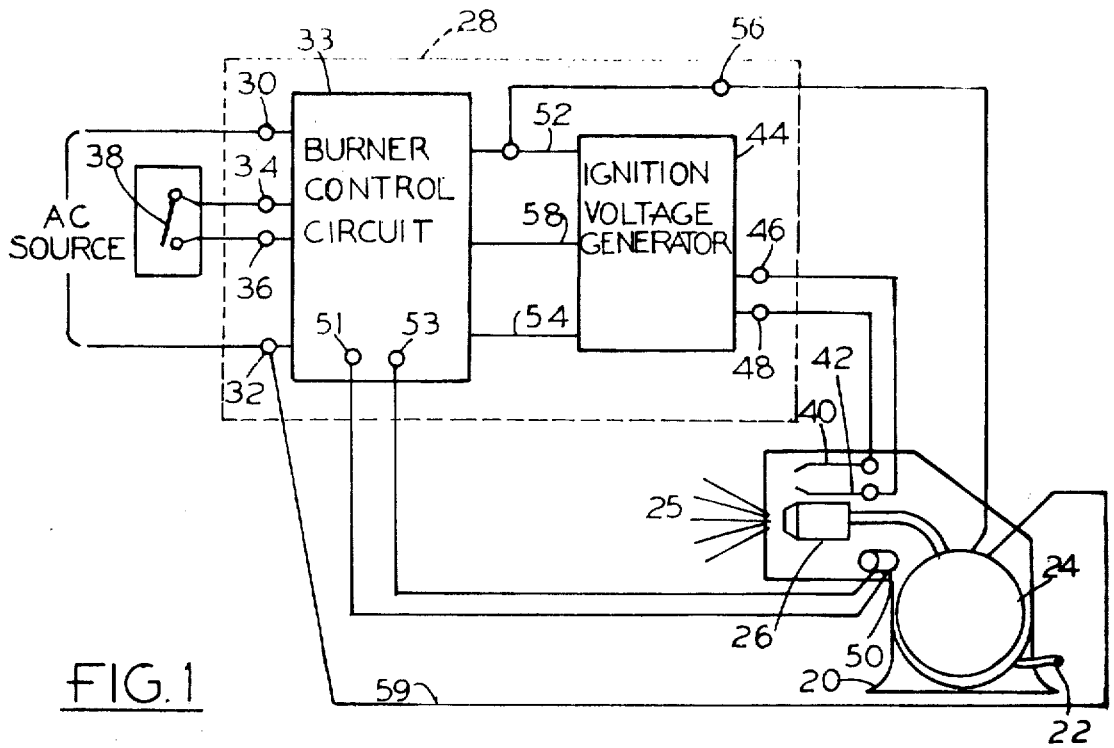
FIG. 1 is a schematic diagram of an oil burner assembly with a burner control and ignition generator indicated in block form.

In FIG. 1, there is shown an oil burner control system for oil burner assembly 20, arranged to be supplied with oil by an oil supply line 22 under the control of a fuel pump, not shown, forming part of the burner assembly, and driven by the burner motor 24 to provide a diverging spray cone of oil 25 at nozzle 26 when the motor is running, the motor being supplied with alternating current power by a combined circuit 28 to be described. Input terminals 30 and 32 of burner control circuit 33 are connected to a source of alternating current voltage and terminals 34 and 36 are connected to a thermostatic switch 38, the latter controlling the turning on and off of the combined circuit 28 in response to demand for heat. Spark gap electrodes 40 and 42 in burner assembly 20 provide spark discharges for ignition of the oil spray 25 and are connected to spark voltage generator 44 which forms part of the combined circuit 28, the electrodes being connected to terminals 46 and 48 wherewith they are supplied with spark voltage when generator 44 is operating. Flame detector 50, located in burner assembly 20 or adjacent to the burner combustion chamber, not shown, senses the presence or absence of flame issuing from burner 20, developing a high resistance in the absence of flame and a low resistance in the presence of flame. Burner control circuit 33 controls the flow of power from the alternating current source to the generator 44 via lines 52 and 54, and to motor 24 via terminal 56, motor 24 also being connected to terminal 32 by line 59.

With line voltage applied to terminals 30 and 32 and thermostatic switch 38 open, combined circuit 28 is inoperative and the burner is off. When switch 38 is closed, burner control circuit 33 will apply power to line 52 and terminal 56 provided that flame sensor 50 is not at low resistance, and will thereby energize generator 44 to produce sparking voltage at terminals 48 and 46 for sparking at electrodes 40 and 42, and causing motor 24 to operate. Motor 24 drives an air blower fan, not shown, to provide combustion air and as mentioned previously also drives a fuel pump which provides a cone of oil spray 25 from nozzle 26. Spark discharges from electrodes 40 and 42 ignite the oil spray, ignition takes place, the resulting flame is detected by flame sensor 50 and burner control circuit 33 causes generator 44 to cease operating. So long as switch 38 is closed and flame sensor 50 is sensing the presence of flame, the burner will continue to operate until switch 38 opens. However, in the event that flame ceases to be detected initially or on a flame extinguishment during a burning period, sensor 50 acts on burner control circuit 33 to reactivate generator 44 in an attempt to ignite the burner, while at the same time a circuit breaker trip switch in ignition control circuit 33 will act after a predetermined period of time to shut combined circuit 28 off, thus stopping the operating of the burner and requiring manual reset of the trip switch.

The burner in FIG. 1 is of the gun-type and has been shown for illustrative purposes only, since a blue-flame burner could have been used in lieu without altering the explanation of the control system.

Figure 2:
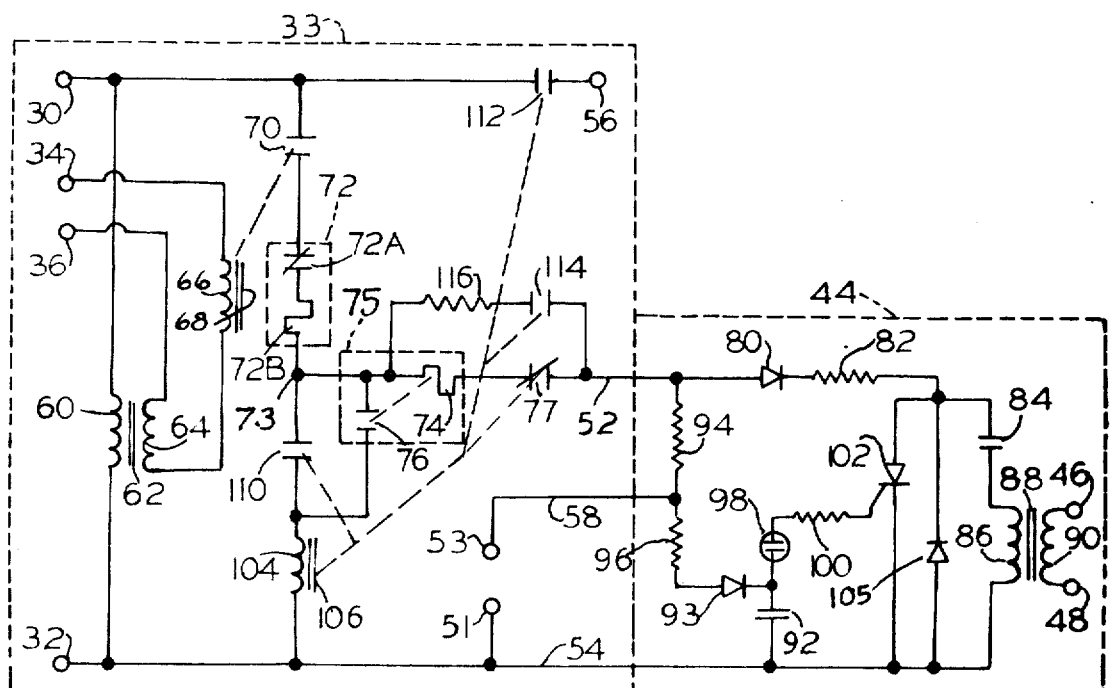
FIG. 2 is a combined circuit diagram of the burner control circuit and ignition voltage generator of FIG. 1.

In FIG. 2 is shown a specific embodiment of the invention wherein control circuit 33 and spark generator 44 of FIG. 1 are combined to minimize the component parts. In FIG. 2, parts corresponding to those shown in FIG. 1 are given corresponding reference numerals. As shown, the input supply terminal 30 is connected through the primary winding 60 of transformer 62 to input terminal 32 and common line 54 thereby energizing transformer 62 at all times that power is applied to terminals 30 and 32. Secondary winding 64 of transformer 62 provides a reduced voltage to energize winding 66 of relay 68 when thermostatic switch 38, connected across terminals 34 and 36, is closed. Normally open relay contact 70 of relay 68 when closed by the energizing of relay 68 provides power to the balance of the control circuit and the spark voltage generator.

Relay contact 70 has one side connected to input terminal 30 and the other side to circuit breaker or switch 72 which is of the thermal responsive heater resistance type with a tripping element to open the normally closed contact 72A when heated by the heater 72B. The circuit breaker is of the conventional type which, when once tripped, must be manually reset before further operation. The other side of breaker 72 is connected to reference point 73. Although contact 72A and heater 72B are illustrated to be in simple series arrangement whereby breaker 72 is a two-terminal device, it is possible, and under certain conditions may be desirable, to electrically separate heater 72B from contact 72A and to relocate it in another portion of the circuit leading to generator 44.

A series circuit is formed between reference point 73 and common line 54 and consists of, beginning at reference point 73, heater element 74 of a heater responsive switch or time delay relay 75 having a pair of normally open contacts 76, a pair of normally closed contacts 77 of an electro-magnetically operated relay 106, reference line 52, the anode and cathode of rectifier diode 80, resistor 82, capacitor 84 and the primary winding 86 of high voltage transformer 88 whose secondary winding 90 is connected to spark voltage terminals 46 and 48, the other side of winding 86 being connected to reference line 54. Capacitor 92 having one plate connected to line 54 draws charging current from reference line 52 through resistors 94 and 96 and rectifier diode 93. Capacitor 92 is also connected via voltage breakdown device 98 and resistor 100 to the gate of silicon controlled rectifier 102 whose cathode is connected to line 54 and whose anode is connected to the junction of resistor 82 and capacitor 84. Rectifier diode 105 is reverse conductively connected across the anode and cathode of silicon controlled rectifier 102. The junction of resistor 94 and resistor 96 is connected via reference line 58 to terminal 53 and thence through photocell 50 to terminal 51 and line 54. Also connected in series between reference point 73 and line 54 is normally open contact 76 of switch 75 and winding 104 of relay 106, relay 106 having a first pair of normally open contacts 110 connected in parallel with contact 76, a second set of normally open contacts 112 connected between terminal 30 and terminal 56 and a third set of normally open contacts 114 connected in series with resistor 116 across the series arrangement of heater 74 and normally closed contacts 77, the latter contacts also being actuated by relay 106.

When thermostat 38 closes in a demand for heat from the oil burner, relay 68 is energized and contacts 70 close to allow capacitor 84 to charge through contacts 70, circuit breaker 72, heater 74, normally closed contact 77, diode 80, resistor 82 and the primary winding of resistor 86. In practice, capacitor 84 is large, being of the order of 100 or more microfarads and the combined resistance of resistor 82, heater 74 and heater 72B of breaker 72 is such that it takes several cycles of the applied voltage to fully charge capacitor 84. Although this charging current has a relatively high root mean square value during each charging period, nevertheless capacitor 84 must discharge and charge several times, to heat heater 74 sufficiently to cause contacts 76 to close, this heating period being of the order of one second. Furthermore, the charging current of capacitor 84 will, after a predetermined period of continuous charging and discharging, usually 15 seconds or more, cause breaker 72 to operate to shut off the burner. Since resistor 94 and photocell 50 constitute a voltage divider across lines 52 and 54, the high or low resistance of photocell 50 will determine whether or not capacitor 92 can charge to the breakdown voltage of breakdown device 98. The values of capacitor 92 and resistor 96 are selected so that silicon controlled rectifier 102 will be triggered approximately 10 to 15 times per second, so long as photocell 50 is dark. Each time that silicon controlled device 102 is triggered, it discharges capacitor 84 through the primary winding 86 of transformer 88, thereby inducing a high voltage in winding 90 and causing a spark to occur at electrodes 40 and 42 to ignite oil issuing at the burner. Since the discharge period of capacitor 84 is of the order of a few miliseconds, each time that capacitor 84 is discharged, it begins to charge again through the previously described circuit thereby maintaining the charging current all during the time that sparks are recurring regularly, thus continuing to heat heater 72B of circuit breaker 72, and heater 74.

When heater 74 heats sufficiently to cause contacts 76 to close, relay winding 104 is energized via contacts 76 and relay 106 operates, causing contacts 110 to close and thereby latching in relay 106 as long as contact 70 of relay 68 and contact 72A of breaker 72 remain closed. Also, when relay 106 operates, normally closed contact 77 opens thereby discontinuing the heating of heater 74 allowing the latter to cool off, normally open contacts 112 close to apply power to terminal 56 for motor operation, and normally open contacts 114 close thereby introducing resistor 116 in the charging circuit of capacitor 84. Since relay 106 latches in through its own contact 110 it will remain energized until contact 70 opens due to opening of the thermostatic switch 38, or until breaker 72 operates to open contact 72A.

With power applied to the motor, fuel will issue from the burner to be ignited by sparks occurring between electrodes 40 and 42, and photocell 50 will be illuminated by the resultant flame thereby lowering the resistance across terminals 53 and 51 to the point where capacitor 92 will not charge to the breakdown voltage of breakdown device 98 with the result that sparking will stop. When sparking is thus terminated due to the presence of flame at the burner, capacitor 84 will charge up and remain charged until sparking occurs again, thus reducing the current through the circuit breaker 72 to the very low value required to energize relay 106, thereby allowing heater 72B of breaker 72 to cool and so preventing breaker 72 from operating.

On the other hand, if, during the start up of the burner, flame is not established, photocell 50 will remain dark and sparkling will continue until circuit breaker 72 operates and opens contact 72A on a latching arrangement, thereby cutting off power to relay 106 and the spark generating circuit with the result that power is disconnected from the circuit and the burner shuts down until circuit breaker 72 is manually reset.

Furthermore, if, when thermostatic switch 38 closes, photocell 50 is illuminated for any reason, its low resistance will prevent triggering of silicon controlled rectifier 102 with the result that capacitor 84 will charge up and remain charged thereby preventing sufficient heating of heater 74 to close contacts 76 with the result that relay 106 will not be energized until photocell 50 is changed to a dark state again. In this fashion, the burner is prevented from attempting ignition if the photocell is illuminated when a demand for heat is first made.

It will be apparent from the foregoing that the combined circuit may be readily separated into the control section 33 and the ignition voltage generator 44, connected together via lines 52, 58 and 54, thus permitting the physical separation of the two sections with ready interconnecting means to maintain their combined circuit nature with a minimum of circuit components, as illustrated in FIG. 6 of my copending application No. 750,657.

Because the air spark gap formed between electrodes 40 and 42 in FIG. 1 must be adjacent to but not in the oil spray 25 when burner 20 is of the gun-type, the hot plasma formed by the spark discharge must be maintained at a sufficiently high energy level and for a long enough period to permit the combustion airflow to deflect the spark plasma away from the electrode gap and into the oil spray 25.

In spark generator circuit 44 of FIG. 2, the spark voltage is supplied in pulses by the discharge of capacitor 84 through silicon controlled rectifier 102 and primary winding 86 of ignition transformer 88. Since there is a finite period of time between the spark voltage pulses, each voltage pulse must be made to endure long enough to permit significant deflection of the spark plasma. This may be readily accomplished using low cost, mass-produced components for capacitor 84 and transformer 88. For instance, with a 200 microfared electrolytic capacitor for capacitor 84 and an automobile ignition coil of the so-called heavy duty type for transformer 88, a spark discharge duration of 1.5 milliseconds is readily obtainable, this, in practice, being sufficient to ignite the majority of gun-type oil burners.

Diode 105 is reverse conductively connected across silicon controlled rectifier 102 to provide a reverse low impedance path for oscillation of current between capacitor 84 and tarnsformer 88.

As will be readily apparent, the RMS value of the charging current for capacitor 84 will be determined by the sparking rate of generator 44 and the capacitance of capacitor 84. For example, the RMS value of the charging current with an applied voltage of 120 volts, 60 cycles and a spark rate of 10 per second is very nearly four-tenth of an ampere. The combined charging resistances total 50 ohms. If, for example, capacitor 80 fails in the shorted mode, the charging resistance will experience a 60 cycle half wave current whose RMS value would be equal to:

$$I = \tfrac{1}{2} \times \frac{E_{app}}{R_c}$$
$$= \tfrac{1}{2}\left(\frac{120}{50}\right)$$
$$= 1.2 \text{ amperes}$$

where $E_{app}$ = volts RMS
$R_c$ = charging resistance = 50 ohms.

Thus if capacitor 84 is short circuited, the increase in heating (charging) current through heater 72B of breaker 72 is in the ratio of $$\frac{1.2}{0.4}$$

and the increase in heating effect is in the ratio $$\left(\frac{1.2}{0.4}\right)^2 = \frac{9}{1}$$

thus greatly shortening the time that breaker 72 takes to shutoff the burner under this possible component failure condition.

Similarly if any one of diode 80, SCR 102 or diode 104 short circuit between anode and cathode, the time to operate breaker 72 will be shortened.

While a single form of the invention has been illustrated and described it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. For use in an oil burner control system comprising a source of alternating current having one line and an other line, an oil burner having a motor operated air blower and fuel pump, an air spark gap disposed adjacent the oil burner to ignite fuel issuing therefrom when energized, a thermostatic switch, a flame sensor having low resistance in the presence of flame at the burner and high resistance in the absence of flame at the burner, a combined burner ignition and control circuit having connections extending to said source of alternating current, to said motor, to said air spark gap, to said thermostatic switch and to said flame sensor, said circuit comprising a first series circuit disposed across said one line and said other line comprising from said one line normally open switch means closing in response to closure of said thermostatic switch, a thermally actuated trip switch, the heater element of a thermally actuated delay relay having a set of normally open contacts, a set of normally closed contacts of an electromagnetic relay, the anode and cathode of a first rectifier diode, a first resistor, a first capacitor and the primary winding of a step-up ignition transformer to said other line, a second series circuit disposed across said heater and said normally closed contacts comprising a second resistor and a first set of normally open contacts of said electromagnetic relay, a third series circuit connected from the junction of said trip switch and said heater through said normally open contacts of said delay relay and the winding of said electromagnetic relay to said other line, and having a second set of normally open contacts of said electromagnetic relay disposed across said normally open contacts of said delay relay, a fourth series circuit disposed across said first resistor and diode comprising from the anode of said diode a third resistor, a fourth resistor, the anode and cathode of a second diode, a second capacitor, said other line and the cathode and anode of a silicon controlled rectifier in that order to the other end of said first resistor, the gate of said silicon controlled rectifier being connected through a fifth resistor and a voltage breakdown device to the junction of said second diode and second capacitor and a connection to one of said connections extending to said flame sensor from the junction between the third and fourth resistors, and a third rectifier diode connected in reverse conductivity across the anode and cathode of said silicon controlled rectifier, the other of said flame sensor connections being connected to said other line, and the secondary winding of said ignition transformer connected to said connections extending to said air spark gap, and a third normally open set of contacts connected between said one line and one of said connections extending to said motor, the other of said motor connections being connected to said other line.

2. For the control and ignition of an oil burner having a motor operated air blower and fuel pump, spark electrode means, when energized, to ignite fuel issuing from the burner, a source of alternating current power and thermostatic switch means, a combined control and ignition circuit comprising a capacitor-discharge ignition voltage generator operative to repetitively energize said burner electrode means with pulses of voltage, a flame sensor positionable to sense presence or absence of flame at the burner and operatively connected to said voltage generator whereby said generator will operate only in the absence of flame at the burner, a time delay relay responsive to the current charging the discharge capacitor in said generator whereby said delay relay will operate only when said generator has been operative for a predetermined period of time, an electromagnetic relay initially energized to operate only when said delay relay has operated, and thereafter through its own latching contact circuit breaker means responsive to the current charging said discharge-capacitor after a predetermined period of time to disconnect said circuit from its source of power said breaker means being of the trip-switch type requiring manual resetting, said predetermined period of time being significantly shortened by the failure of any circuit element in said generator which increases said charging current above a normal value, first switch means operative, in response to the closing of said thermostatic switch means, to apply said source of power to said combined circuit, and second switch means operative, in response to the operation of said electromagnetic relay, to apply said source of power to said motor.

References Cited

UNITED STATES PATENTS

| | | | |
|---|---|---|---|
| 2,382,216 | 8/1945 | Eskin et al. | 431—66 XR |
| 3,399,948 | 9/1968 | Myers et al. | 431—68 |
| 3,425,780 | 2/1969 | Potts | 431—68 |
| 3,447,880 | 6/1969 | Potts et al. | 431—27 |

FREDERICK L. MATTESON, JR., Primary Examiner

R. A. DUA, Assistant Examiner

U.S. Cl. X.R.

431—71